US012326024B2

(12) United States Patent
Cheng et al.

(10) Patent No.: US 12,326,024 B2
(45) Date of Patent: Jun. 10, 2025

(54) HINGE MECHANISM

(71) Applicant: GANG GWO INDUSTRIAL CO., LTD., Pingtung (TW)

(72) Inventors: Ko-Ming Cheng, Pingtung (TW); Sheng-Chieh Yang, Pingtung (TW)

(73) Assignee: GANG GWO INDUSTRIAL CO., LTD., Pingtung (TW)

( * ) Notice: Subject to any disclaimer, the term of this patent is extended or adjusted under 35 U.S.C. 154(b) by 18 days.

(21) Appl. No.: 18/372,375

(22) Filed: Sep. 25, 2023

(65) Prior Publication Data

US 2025/0075544 A1 Mar. 6, 2025

(30) Foreign Application Priority Data

Aug. 30, 2023 (TW) ................................ 112132868

(51) Int. Cl.
*E05D 7/04* (2006.01)
*E05D 3/02* (2006.01)
(Continued)

(52) U.S. Cl.
CPC ................ *E05D 7/04* (2013.01); *E05D 3/02* (2013.01); *E05D 7/02* (2013.01); *E05D 11/0054* (2013.01);
(Continued)

(58) Field of Classification Search
CPC .... E05D 7/04; E05D 7/02; E05D 3/02; E05D 2007/0469; E05D 5/0246; E05D 11/0054;
(Continued)

(56) References Cited

U.S. PATENT DOCUMENTS 2,685,102 A * 8/1954 Forkey ...................... E05D 3/02 16/284
3,098,258 A * 7/1963 Ruiz ..................... E05F 1/1223 16/312
(Continued)

FOREIGN PATENT DOCUMENTS

EP 2264269 12/2010
EP 3922798 12/2021
(Continued)

OTHER PUBLICATIONS

Search report from EPO, dated Mar. 28, 2024.

*Primary Examiner* — Jason W San
*Assistant Examiner* — Matthew J Sullivan
(74) *Attorney, Agent, or Firm* — Hershkovitz & Associates, PLLC; Abe Hershkovitz

(57) ABSTRACT

A fixation seat having a first guiding element and a second guiding element mounted inside of a hinge mechanism is mounted at a wall or a frame's surface. A first guided assembly and a second guided assembly are mounted at the fixation seat and respectively guided by the first guiding element and the second guiding element to move away from each other or move back. A movable assembly comprises a movable and pivotable shaft mounted through the fixation seat and optionally connected to the first guided assembly or the second guided assembly. A door is mounted at the movable assembly and pivots relative to the surface through the shaft. The movable assembly lifts and lowers the door via the shaft, connected one of the guided assemblies, guided by the guiding elements, so the hinge mechanism is adaptable to install the door at left-side or right-side surfaces.

14 Claims, 9 Drawing Sheets

(51) Int. Cl.
*E05D 7/02* (2006.01)
*E05D 11/00* (2006.01)

(52) U.S. Cl.
CPC ... *E05D 2007/0469* (2013.01); *E05Y 2201/11* (2013.01); *E05Y 2900/132* (2013.01)

(58) Field of Classification Search
CPC ............. E05D 11/1064; E05D 11/1028; E05D 11/105; E05D 11/1078; E05D 11/1042; E05Y 2201/11; E05Y 2900/132; E05Y 2900/114
See application file for complete search history.

(56) References Cited

U.S. PATENT DOCUMENTS 3,851,354 A * 12/1974 Anderson ........... E05D 11/1064 16/331
4,494,275 A * 1/1985 Hsi-Shan ................ E05F 1/063 16/314
5,274,882 A * 1/1994 Persson ............... H04M 1/0216 16/229
5,867,869 A * 2/1999 Garrett .................... E05D 15/54 16/334
5,867,871 A * 2/1999 Tasman ............... E05D 11/1014 16/335
6,070,294 A * 6/2000 Perkins ............... E05D 11/0054 16/334
6,161,255 A * 12/2000 Garrett ................ E05D 11/1064 16/382
6,665,906 B2 * 12/2003 Li ....................... E05D 11/1007 16/303
6,948,217 B2 * 9/2005 Higano ................. G06F 1/1616 16/303
7,010,832 B2 * 3/2006 Chen ......................... E05D 5/14 16/235
7,188,390 B2 * 3/2007 Cheng ................... E05D 7/0415 16/241
7,243,394 B2 * 7/2007 Kao .......................... E05F 3/20 16/284
7,266,864 B2 * 9/2007 Kim .................... H04M 1/0212 16/367
7,594,302 B2 * 9/2009 Balenzano .............. E05D 7/081 16/281
7,735,196 B2 * 6/2010 Centmayer ........... F16D 63/006 16/334
7,900,319 B2 * 3/2011 Bacchetti .............. E05D 5/0246 16/382
7,945,996 B2 * 5/2011 Gunderson ............. E05F 1/063 16/303
8,209,816 B2 * 7/2012 Heger ....................... B60R 1/06 16/334
8,381,357 B2 * 2/2013 Zinn ..................... E05F 1/1215 16/250
8,490,248 B2 * 7/2013 Chen .................... H05K 5/0226 16/292
8,556,330 B2 * 10/2013 Lazarevich ........... E05D 7/1005 16/334
8,572,807 B2 * 11/2013 Walhorn ............. E05D 11/1064 16/235
8,745,822 B2 * 6/2014 Garrett .................. E05D 5/0246 16/252
8,752,247 B2 * 6/2014 Franchini .............. E05D 11/105 16/334
9,416,574 B2 * 8/2016 Mitchell ............... E05F 1/1223
9,422,757 B2 * 8/2016 Bacchetti ............ E05D 11/1028
9,493,973 B2 * 11/2016 Mitchell ............... E05F 1/1223
9,567,785 B2 * 2/2017 Wang ........................ E05D 3/02
9,695,621 B2 * 7/2017 Walhorn ................. E05F 3/104
9,739,523 B1 * 8/2017 Augsburger .............. E05D 3/02
9,845,627 B2 * 12/2017 Loggen ............... E05D 11/1014
9,995,069 B2 * 6/2018 Ghantous ................ E05F 1/043
10,400,495 B1 * 9/2019 Yu ........................... E05F 3/102
10,480,230 B2 * 11/2019 Brun ......................... E05D 5/12
10,550,619 B2 * 2/2020 Caffrey ................... E05F 1/063
11,746,581 B2 * 9/2023 Krolewski ............ E05D 7/1016 16/380
11,767,694 B2 * 9/2023 Naganuma .......... E05D 11/1078 16/221
11,939,804 B2 * 3/2024 Laws ...................... E05D 11/08
2005/0125949 A1 * 6/2005 Lin ..................... E05D 11/1064 16/248
2006/0213031 A1 * 9/2006 Niu ...................... G02C 5/2227 16/228
2006/0242792 A1 * 11/2006 Kienle ................ E05D 11/1078 16/252
2008/0168621 A1 * 7/2008 Lin ..................... E05D 11/1064 16/252
2009/0001232 A1 * 1/2009 Seo ........................ F16M 13/04 248/176.1
2012/0091867 A1 * 4/2012 Bouwman ............... E05D 7/081 16/319
2016/0017648 A1 * 1/2016 Petrelli ................. E05D 11/105 16/284
2018/0149409 A1 5/2018 Ramm et al.
2023/0193679 A1 * 6/2023 Murauer ................... E05F 5/00 16/54
2023/0399884 A1 * 12/2023 Stuart ........................ E05F 5/02
2024/0068286 A1 * 2/2024 Larson ...................... E05D 3/02
2024/0209664 A1 * 6/2024 Liang .................... E05F 1/1223

FOREIGN PATENT DOCUMENTS

IT UA20164327 12/2017
KR 20050097056 10/2005
TW M264352 5/2005
TW I486516 6/2015
TW I660106 5/2019
WO 03/044974 A1 5/2003

* cited by examiner

HINGE MECHANISM

BACKGROUND OF THE INVENTION

1. Field of the Invention

The present invention relates to a hinge mechanism, especially to a lift hinge that can be used to install a door plate to any of two different installing surfaces at left and right sides, and can lift or lower the door plate.

2. Description of Related Art

A hinge is used to install a door plate to an installing surface of a wall or a door frame, and can make the door plate pivot relative to the installing surface to open or close the door plate. The hinge usually comprises a fixation seat, a shaft and a door-fixing component. The fixation seat is mounted on the installing surface. The shaft is mounted through the fixation seat and connects the door-fixing component. The door plate is mounted at the door-fixing component, so it can pivot via the door-fixing component and the shaft relative to the installing surface, which is connected with the fixation seat.

Additionally, compared to the normal hinge, a lift hinge nowadays further comprises a lift assembly. The lift assembly is mounted at the fixation seat. The shaft of the lift hinge is mounted at the lift assembly and connects the door-fixing component. When the door plate is closed, a bottom of the door plate is near the ground. When the door plate, mounted at the door-fixing component, is pushed, the lift assembly lifts the door-fixing component and the shaft relative to the fixation seat, so the door plate is lifted to prevent the bottom of the door plate from scratching the ground and getting damaged.

However, the lift hinge nowadays can only be used to install the door plate to a surface at one side. That is, the lift hinge can only install the door plate at either the left-side or the right-side installing surface of a wall or a door frame. For the installing surface at a left side of the door plate, a left-side lift hinge is required to connect the door plate and the left-side installing surface. As for the installing surface at a right side of the door plate, a right-side lift hinge is required to connect the door plate and the right-side installing surface. If misusing the left-side lift hinge to connect the door plate and the right-side installing surface, when the door plate is pushed, the left-side lift hinge will lower the door plate, causing it to scratch the ground. So, the lift hinge nowadays is not universal for installing the door plate at both of the left-side and right-side installing surfaces, causing inconvenience in installation, usage and manufacture, and therefore needs to be improved.

SUMMARY OF THE INVENTION

The objective of the invention is to provide a hinge mechanism to resolve the drawback of a conventional lift hinge that can only be used to install a door plate to one single side of a wall, cannot be used to install the door plate at both left-side and right-side installing surfaces, and therefore is inconvenient in installation, usage and manufacture.

A hinge mechanism comprises a fixation seat, a first guided assembly, a second guided assembly and a movable assembly. The fixation seat has a first containing indentation, a second containing indentation, a first guiding element and a second guiding element. The first containing indentation and the second containing indentation are arranged axially up and down and opposite to each other, and are in spatial communication with each other. The first guiding element is mounted in the first containing indentation. The second guiding element is mounted in the second containing indentation. The first guided assembly is mounted at the first containing indentation of the fixation seat, corresponds to and abuts the first guiding element. The second guided assembly is mounted at the second containing indentation of the fixation seat, corresponds to and abuts the second guiding element. The first guided assembly is guided by the first guiding element to move away from the second guided assembly or move back to its original position. The second guided assembly is guided by the second guiding element to move away from the first guided assembly or move back to its original position. The movable assembly comprises a shaft and a door-fixing component. The shaft is axially movable and pivotable, and is mounted through the fixation seat, the first containing indentation and the second containing indentation of the fixation seat. The shaft is optionally connected to one of the first guided assembly and the second guided assembly. The door-fixing component is mounted at the shaft, such that the door-fixing component is pivotable relative to the fixation seat via the shaft. When the shaft is connected to the first guided assembly, while the door-fixing component is pivoted, the door-fixing component is moved up and down via the first guided assembly guided by the first guiding element. When the shaft is connected to the second guided assembly, while the door-fixing component is pivoted, the door-fixing component is moved up and down via the second guided assembly guided by the second guiding element.

The hinge mechanism is used to install a door plate to an installing surface of a wall or door frame. The fixation seat is mounted on the installing surface, and the door plate is installed to the door-fixing component of the movable assembly. According to at which of a left or a right side of the door plate the installing surface is located, a user connects the shaft to the chosen first or second guided assembly, so the shaft is connected and driven with the chosen one of the guided assemblies and is not driven with the other one of the guided assemblies. When pushed, the door plate pivots relative to the installing surface via the shaft, and is lifted or lowered as the shaft is moved with the first guided assembly or the second guided assembly, wherein the first guided assembly is guided by the first guiding element and the second guided assembly is guided by the second guiding element.

In addition, by the shaft optionally connected to the first guided assembly, guided by the first guiding element, or the second guided assembly, guided by the second guiding element, the door plate, the door-fixing component and the shaft can be moved up and down. Because the first guided assembly and the second guided assembly are guided to move away from each other or move back, the user can install the door plate to any of the left-side and right-side installing surfaces. By choosing to connect the shaft with the first guided assembly or the second guided assembly, the door plate is lifted when pushed open and is lowered when returning to its original position, the door plate functions in lifting and lowering normally, and is therefore convenient in installation, usage and manufacture.

DETAILED DESCRIPTION OF THE PREFERRED EMBODIMENT

With reference to FIGS. 1 to 4, a hinge mechanism in accordance with the present invention comprises a fixation seat 10, a first guided assembly 20, a second guided assembly 30 and a movable assembly 40.

Figure 3:
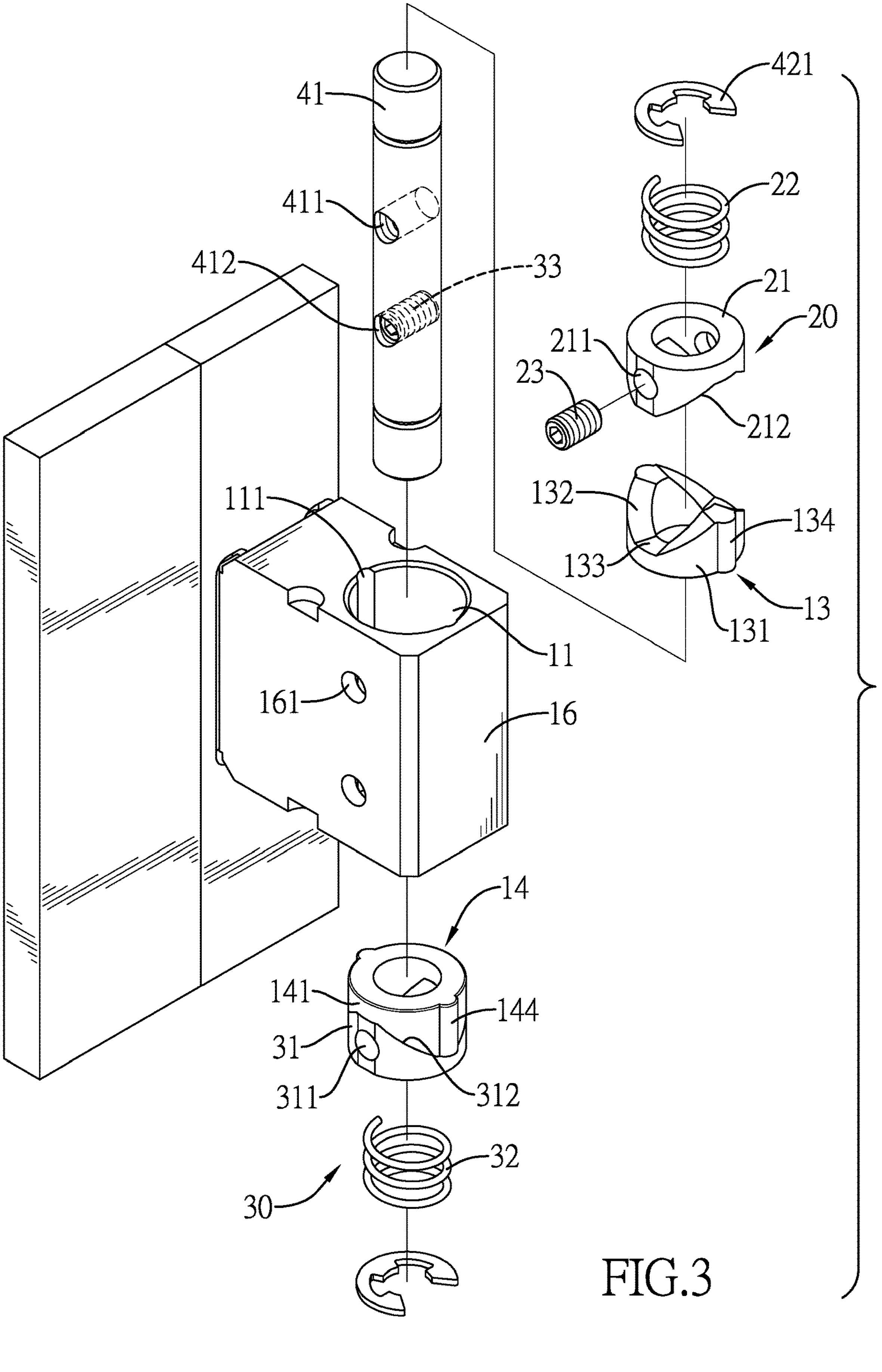
FIG. 3 is a partially-exploded perspective view of a fixation seat, a first guided assembly, a second assembly and a shaft of the hinge mechanism in accordance with the present invention.
Figure 4:
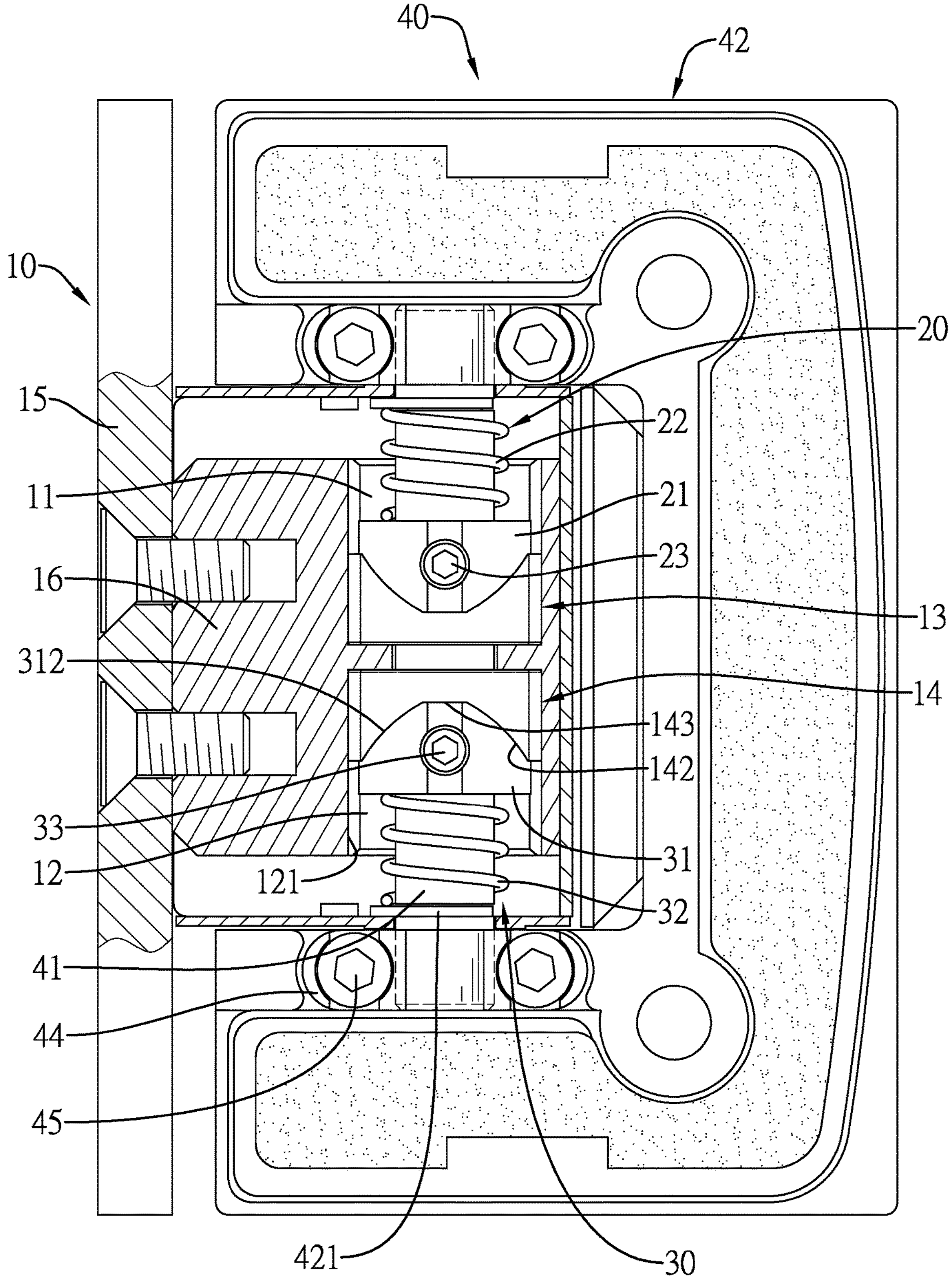
FIG. 4 is a front sectional view of the hinge mechanism in accordance with the present invention.

With reference to FIGS. 3 and 4, the fixation seat 10 has a first containing indentation 11, a second containing indentation 12, a first guiding element 13 and a second guiding element 14. The first containing indentation 11 and the second containing indentation 12 are arranged axially up and down and opposite to each other, and are in spatial communication with each other. The first guiding element 13 is mounted in the first containing indentation 11. The second guiding element 14 is mounted in the second containing indentation 12.

With reference to FIGS. 3 and 4, the first guided assembly 20 is mounted at the first containing indentation 11 of the fixation seat 10, corresponds to and abuts the first guiding element 13. The second guided assembly 30 is mounted at the second containing indentation 12 of the fixation seat 10, corresponds to and abuts the second guiding element 14. The first guided assembly 20 is guided by the first guiding element 13 to move away from the second guided assembly 30 or move back to its original position, and the second guided assembly 30 is guided by the second guiding element 14 to move away from the first guided assembly 20 or move back to its original position.

With reference to FIGS. 1 to 4, the movable assembly 40 comprises a shaft 41 and a door-fixing component 42. The shaft 41 is axially movable and pivotable, and is mounted through the fixation seat 10, the first containing indentation 11 and the second containing indentation 12 of the fixation seat 10. The shaft 41 is optionally connected to one of the first guided assembly 20 and the second guided assembly 30. The door-fixing component 42 is mounted at the shaft 41, such that the door-fixing component 42 is pivotable relative to the fixation seat 10 via the shaft 41. When the shaft 41 is connected to the first guided assembly 20, while the door-fixing component 42 is pivoted, the door-fixing component 42 is moved up and down via the first guided assembly 20 guided by the first guiding element 13. When the shaft 41 is connected to the second guided assembly 30, while the door-fixing component 42 is pivoted, the door-fixing component 42 is moved up and down via the second guided assembly 30 guided by the second guiding element 14.

Figure 7:
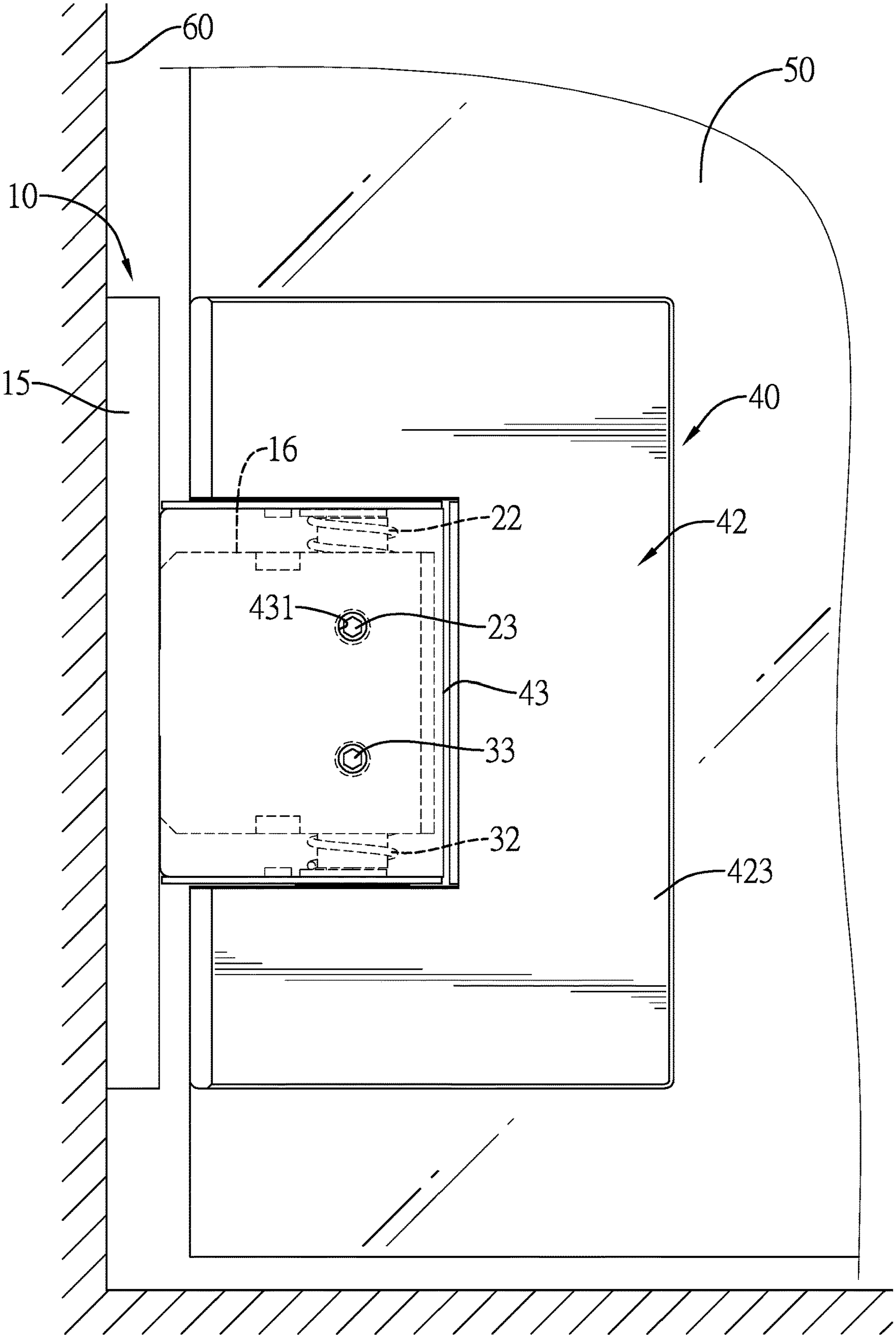
FIG. 7 is a front view of the hinge mechanism in accordance with the present invention, connecting between the left-side installing surface and a door plate.
Figure 8:
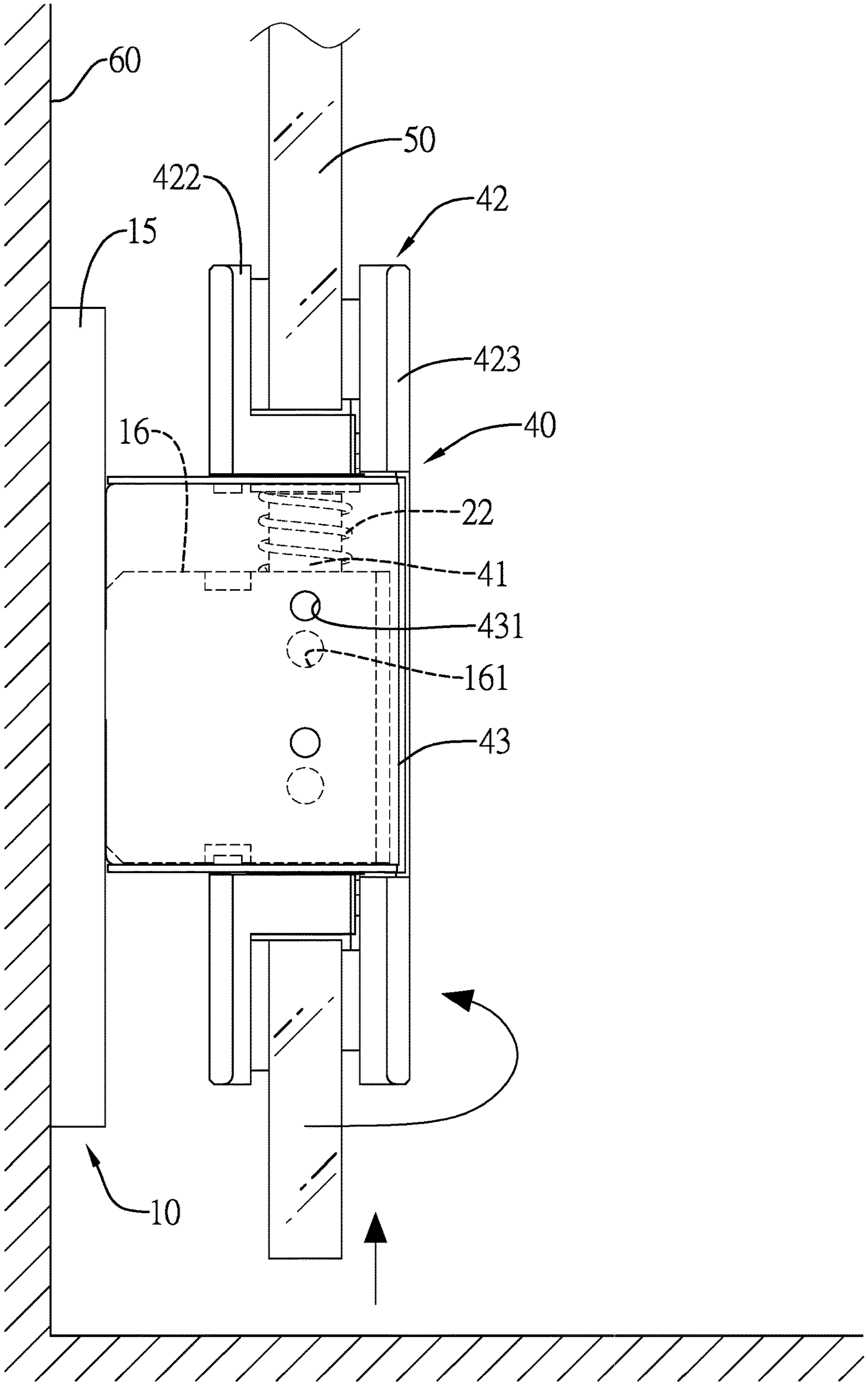
FIG. 8 is a front view of the first guided assembly, guided by a first guiding element and lifting a movable assembly and the door plate when the door plate is pushed.
Figure 9:
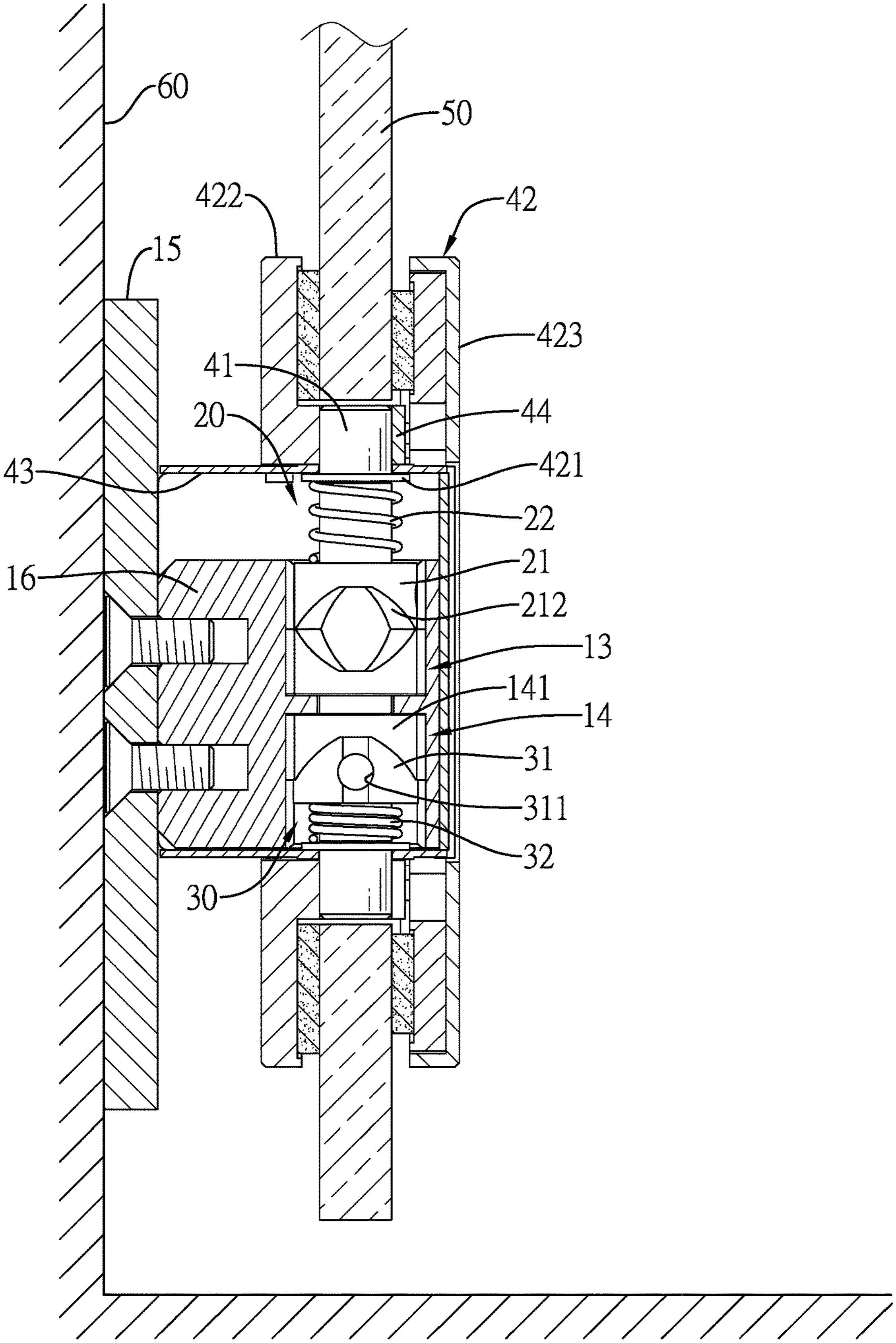
FIG. 9 is a front sectional view of the first guided assembly, guided by the first guiding element and lifting the movable assembly and the door plate when the door plate is pushed.

With reference to FIGS. 7 to 9, the hinge mechanism is used to install a door plate 50 to an installing surface 60 of a wall or a door frame. The fixation seat 10 is mounted on the installing surface 60, and the door plate 50 is installed to the door-fixing component 42 of the movable assembly 40. A user operates the shaft 41 to connect it with the chosen first guided assembly 20 or second guided assembly 30. When being pushed, the door plate 50 pivots relative to the installing surface 60 via the shaft 41, and is lifted or lowered by cooperation between the first guided assembly 20 and the first guiding element 13 or by cooperation between the second guided assembly 30 and the second guiding element 14. In addition, the door plate 50 can be made of glass, metal or other materials.

Besides, with reference to FIGS. 3 to 6, the first guided assembly 20 comprises a first moved element 21, a first elastic element 22 and a first connecting element 23. The first moved element 21 is capable of moving up and down, is pivotable, is mounted in the first containing indentation 11, and abuts the first guiding element 13. The first elastic element 22 abuts the first moved element 21 and the door-fixing component 42. The first connecting element 23 is optionally operated to connect the first moved element 21 and the shaft 41. The second guided assembly 30 comprises a second moved element 31, a second elastic element 32 and a second connecting element 33. The second moved element 31 is capable of moving up and down, is pivotable, is mounted in the second containing indentation 12, and abuts the second guiding element 14. The second elastic element 32 abuts the second moved element 31 and the door-fixing component 42. The second connecting element 33 is optionally operated to connect the second moved element 31 and the shaft 41.

Additionally, the door-fixing component 42 comprises two position-limiting rings 421 mounted on the shaft 41. The first elastic element 22 and the second elastic element 32 respectively abut the two position-limiting rings 421.

Figure 5:
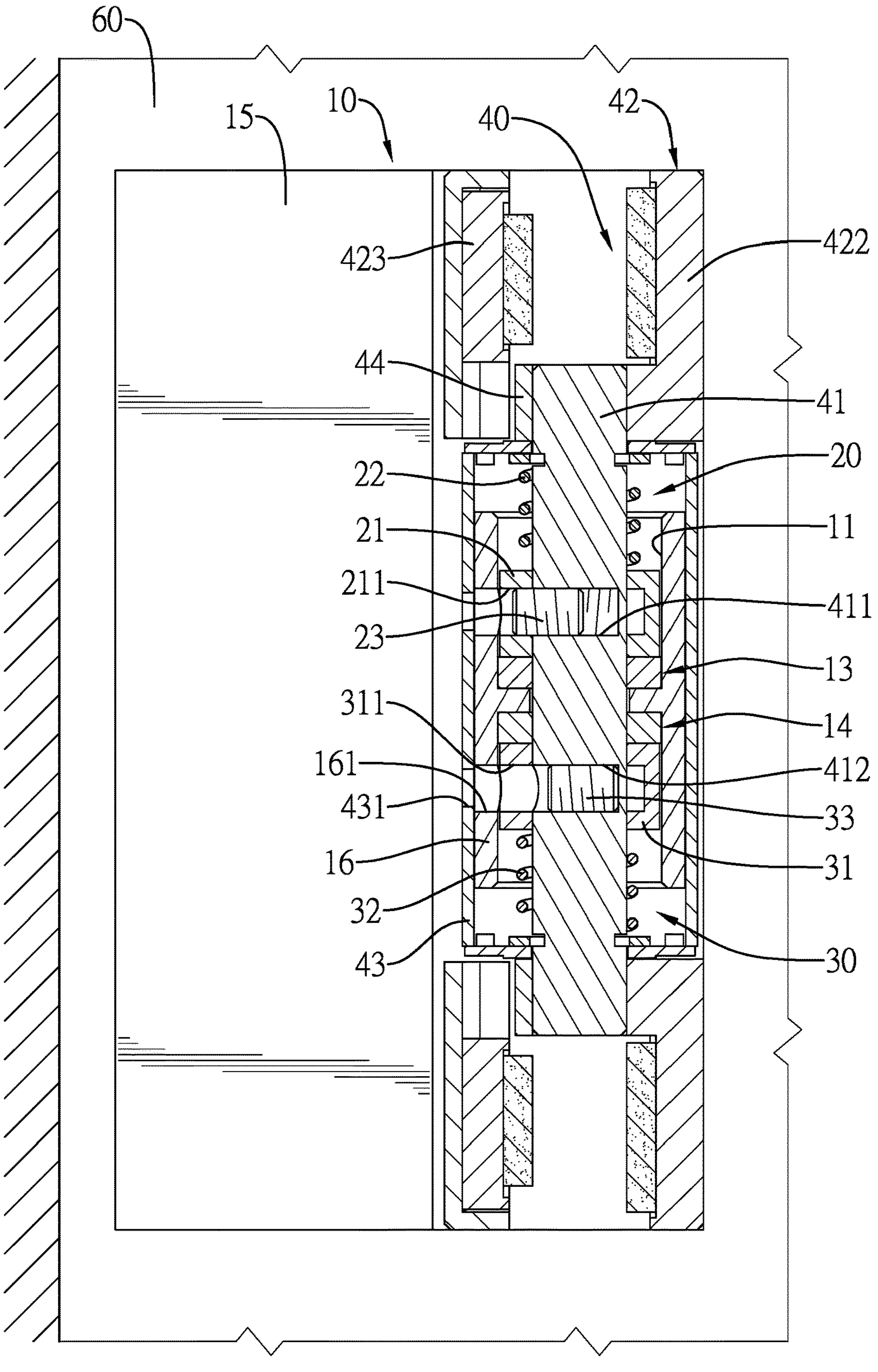
FIG. 5 is a side sectional view of the hinge mechanism in accordance with the present invention, mounted at a left-side installing surface.
Figure 6:
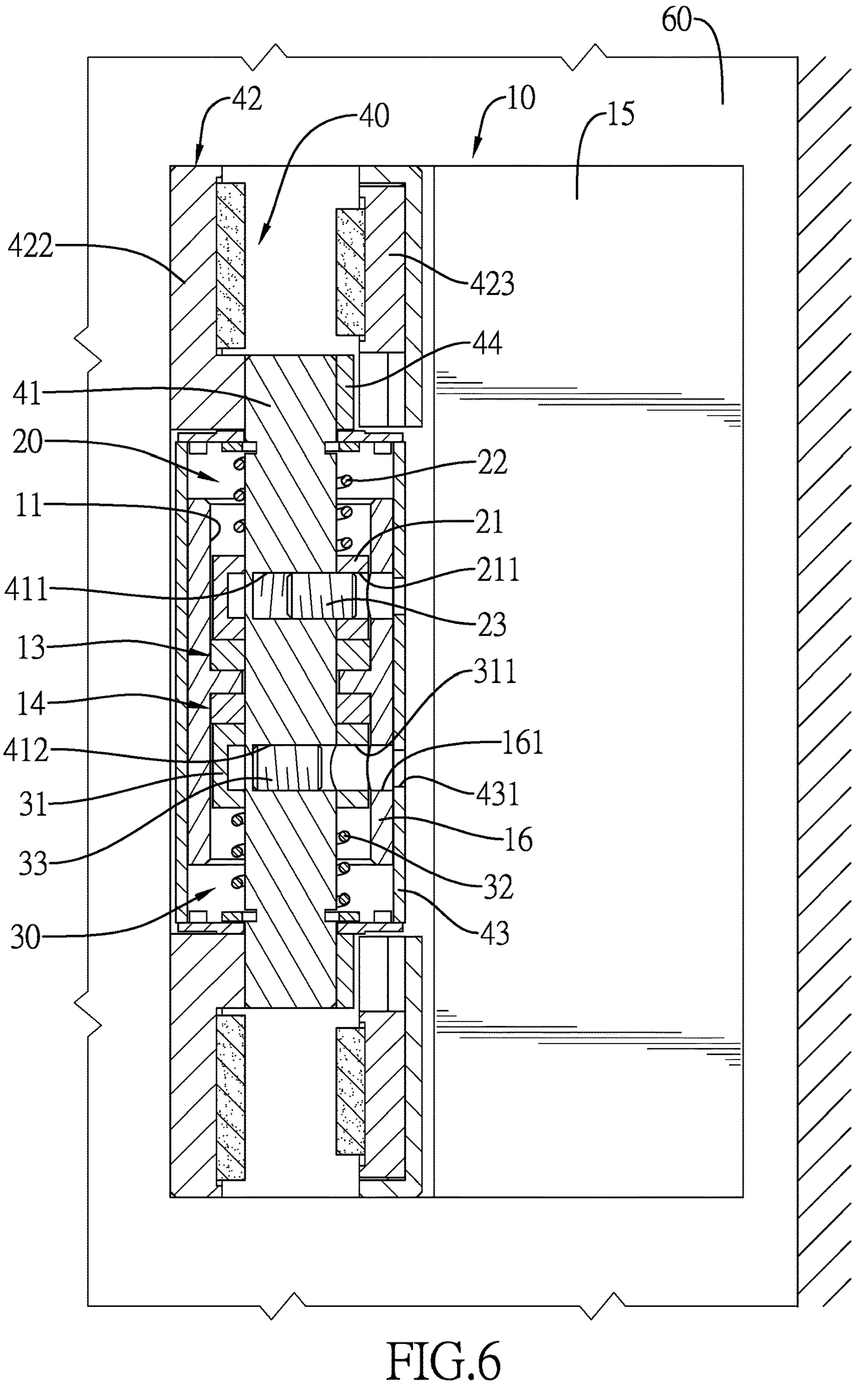
FIG. 6 is a side sectional view of the hinge mechanism in accordance with the present invention, mounted at a right-side installing surface.

Furthermore, with reference to FIGS. 5 and 6, the shaft 41 has a first screw hole 411 and a second screw hole 412 that are arranged up and down and spaced apart from each other. The first connecting element 23 is threaded and is fastened in the first screw hole 411 of the shaft 41. The second connecting element 33 is threaded and is fastened in the second screw hole 412 of the shaft 41. The shaft 41 is mounted through the first moved element 21 and the second moved element 31. The first moved element 21 has a first cooperating hole 211 corresponding to the first screw hole 411. The second moved element 31 has a second cooperating hole 311 corresponding to the second screw hole 412. By operating the first connecting element 23 to connect the first moved element 21 and the shaft 41, the first connecting element 23 reaches into the first cooperating hole 211 of the first moved element 21. By operating the second connecting element 33 to connect the second moved element 31 and the shaft 41, the second connecting element 33 reaches into the second cooperating hole 311 of the second moved element 31.

With reference to FIGS. 3 and 4, the first guiding element 13 has one or two first slopes 131. Two ends of the one or two first slopes 131 are away from the second guiding element 14 relative to a middle point of the one or two first slopes 131. The first moved element 21 abuts the one or two first slopes 131 of the first guiding element 13 and is guided by the one or two first slopes 131 to be moved up and down and pivoted. The second guiding element 14 has one or two second slopes 141. Two ends of the one or two second slopes 141 are away from the first guiding element 13 relative to a middle point of the one or two second slopes 141. The second moved element 31 abuts the one or two second slopes 141 of the second guiding element 14 and is guided by the one or two second slopes 141 to be moved up and down and pivoted.

Moreover, the one or two first slopes 131 of the first guiding element 13 comprise two first inclined segments 132, which are opposite to each other, and a first level segment 133 disposed between the two first inclined segments 132. The first moved element 21 has one or two first cooperating portions 212 abutting the one or two first slopes 131. A contour of the one or two first cooperating portions 212 corresponds to a contour of the one or two first slopes 131. The one or two second slopes 141 of the second guiding element 14 comprise two second inclined segments 142, which are opposite to each other, and a second level segment 143 disposed between the two second inclined segments 142. The second moved element 31 has one or two second cooperating portions 312 abutting the one or two second slopes 141. A contour of the one or two second cooperating portions 312 corresponds to a contour of the one or two second slopes 141. Preferably, an amount of the one or two first slopes 131 of the first guiding element 13 is two, and an amount of the one or two second slopes 141 of the second guiding element 14 is two. Therefore, guidance stability of the first moved element 21 guided by the first guiding element 13 and the second moved element 31 guided by the second guiding element 14 are increased.

With reference to FIGS. 5 and 6, by operating the first connecting element 23, letting it reach into the first cooperating hole 211 of the first moved element 21 while fastened in the shaft 41, the user can choose to connect the shaft 41 with the first guided assembly 20. Hence, when the shaft 41 pivots, the one or two first cooperating portions 212 of the first moved element 21 move along one of the two first inclined segments 132 of the one or two first slopes of the first guiding element 13, and therefore the door-fixing component 42 is lifted or lowered along with the shaft 41 and the first moved element 21. Alternatively, by operating the second connecting element 33, letting it reach into the second cooperating hole 311 of the second moved element 31 while fastened in the shaft 41, the user can choose to connect the shaft 41 with the second guided assembly 30. Hence, when the shaft 41 pivots, the one or two second cooperating portions 312 of the second moved element 31 move along one of the two second inclined segments 142 of the one or two second slopes 141 of the second guiding element 14, and therefore the door-fixing component 42 is lifted or lowered along with the shaft 41 and the second moved element 31.

With reference to FIGS. 1 to 4, the fixation seat 10 comprises an assembling plate 15 and a fixation component 16, which is mounted at the assembling plate 15. The first containing indentation 11 and the second containing indentation 12 of the fixation seat 10 are formed in the fixation component 16, which has two penetrating holes 161. The assembling plate 15 can be mounted at the installing surface 60 of a wall or a door frame.

In addition, the movable assembly 40 comprises a cover 43, which is disposed in the door-fixing component 42 and shields the fixation component of the fixation seat 10, the first guided assembly 20 and the second guided assembly 30. The shaft 41 is mounted through the cover 43, which has two through holes 431 respectively corresponding to the first guided assembly 20 and the second guided assembly 30 in position.

With reference to FIGS. 4 to 6, when the movable assembly 40 is at a starting position, the two penetrating holes 161 of the fixation component 16 respectively align with the two through holes 431 of the cover 43. The one or two first cooperating portions 212 of the first moved element 21 are completely attached to the one or two first slopes 131 of the first guiding element 13. The first cooperating hole 211 of the first moved element 21 aligns with the first screw hole 411 of the shaft 41 and with one of the two through holes 431 of the cover 43. The one or two second cooperating portions 312 of the second moved element 31 are completely attached to the one or two second slopes 141 of the second guiding element 14. The second cooperating hole 311 of the second moved element 31 aligns with the second screw hole 412 of the shaft 41 and with the other one of the two through holes 431 of the cover 43. Therefore, when the movable assembly 40 is at the starting position, the user can use a tool passing through the two through holes 431 of the cover 43 and the two penetrating holes 161 of the fixation component 16 to operate the first connecting element 23 and the second connecting element 33, so the shaft 41 is connected to one of the first connecting element 23 and the second connecting element 33 and is disconnected from the other.

With reference to FIGS. 7 to 9, when the door plate 50 is being pushed, the door plate 50, the door-fixing component 42 and the shaft 41 are moved up and down because the shaft 41 is moved with the first guided assembly 20, which is guided by the first guiding element 13, or with the second guided assembly 30, which is guided by the second guiding element 14. Because the first guided assembly 20 and the second guided assembly 30 are guided to move away from each other or move back, the user can install the door plate 50 to any of the left-side and right-side installing surfaces 60. By installing the fixation seat 10 of the hinge mechanism at the installing surface 60 and choosing to connect the shaft 41 with the first guided assembly 20 or the second guided assembly 30, the door plate 50 is lifted and lowered normally. The door plate 50 is lifted when pushed open and is lowered when returning to its original position, that is, when moved away from the original position, the movable assembly 40 lifts the door plate 50, and when moved back to the original position, the movable assembly 40 lowers the door plate 50. Therefore, the hinge mechanism is convenient in installation, usage and manufacture.

To be specific, as shown in FIGS. 5 and 9, to install the door plate 50 at the left-side installing surface 60, the user operates the first connecting element 23 to let it reach into the first cooperating hole 211 of the first moved element 21 and fasten at the first screw hole 411 of the shaft 41 simultaneously to connect the shaft 41 and the first moved element 21. Then the user operates the second connecting element 33, letting it fasten into the second screw hole 412 of the shaft 41 and detach from the second cooperating hole 311 of the second moved element 31. So, when the door plate 50 is being pushed, the door-fixing component 42 and the shaft 41 move up and down by cooperation between the first moved element 21 and the first guiding element 13. While the movable assembly 40 moves up, the second elastic element 32 is compressed. Alternatively, as shown in FIG. 6, to install the door plate 50 at the right-side installing surface 60, the user operates the second connecting element 33 to let it reach into the second cooperating hole 311 of the second moved element 31 and fasten at the second screw hole 412 of the shaft 41 simultaneously to connect the shaft 41 and the second moved element 31. Then detach the shaft 41 and the first moved element 21, so the door-fixing component 42 and the shaft 41 can move up and down by cooperation between the second moved element 31 and the second guiding element 14.

With reference to FIGS. 7 and 8, when the movable assembly 40 is moved, that is, when the door plate 50 is pushed so the movable assembly 40 is moved away from the original position, the cover 43 is lifted along with the movable assembly 40. The cover 43 shields the fixation component 16 of the fixation seat 10, the first guided assembly 20 and the second guided assembly 30, thus preventing external objects from entering the cover 43 to ensure operation fluency of the movable assembly 40. This further avoids an internal environment of the door plate 50 being seen from an external environment when the door plate 50 is pushed open, therefore increasing aesthetic appeal.

Besides, the fixation component 16, the first guiding element 13 and the second guiding element 14 can be one-piece formed or can be independent units. As shown in FIGS. 3 and 4, the first containing indentation 11 has at least one first position-limiting groove 111. The second containing indentation 12 has at least one second position-limiting groove 121. The first guiding element 13 has at least one first position-limiting protrusion 134 reaching into the at least one first position-limiting groove 111 to limit the first guiding element 13 in position. The second guiding element 14 has at least one second position-limiting protrusion 144 reaching into the at least one second position-limiting groove 121 to limit the second guiding element 14 in position. If the fixation component 16, the first guiding element 13 and the second guiding element 14 are independent units, then by cooperation between the position-limiting grooves and position-limiting protrusions, the first guiding element 13 does not pivot in the first containing indentation 11, and the second guiding element 14 does not pivot in the second containing indentation 12, thereby increasing operation stability of the movable assembly 40.

Figure 1:
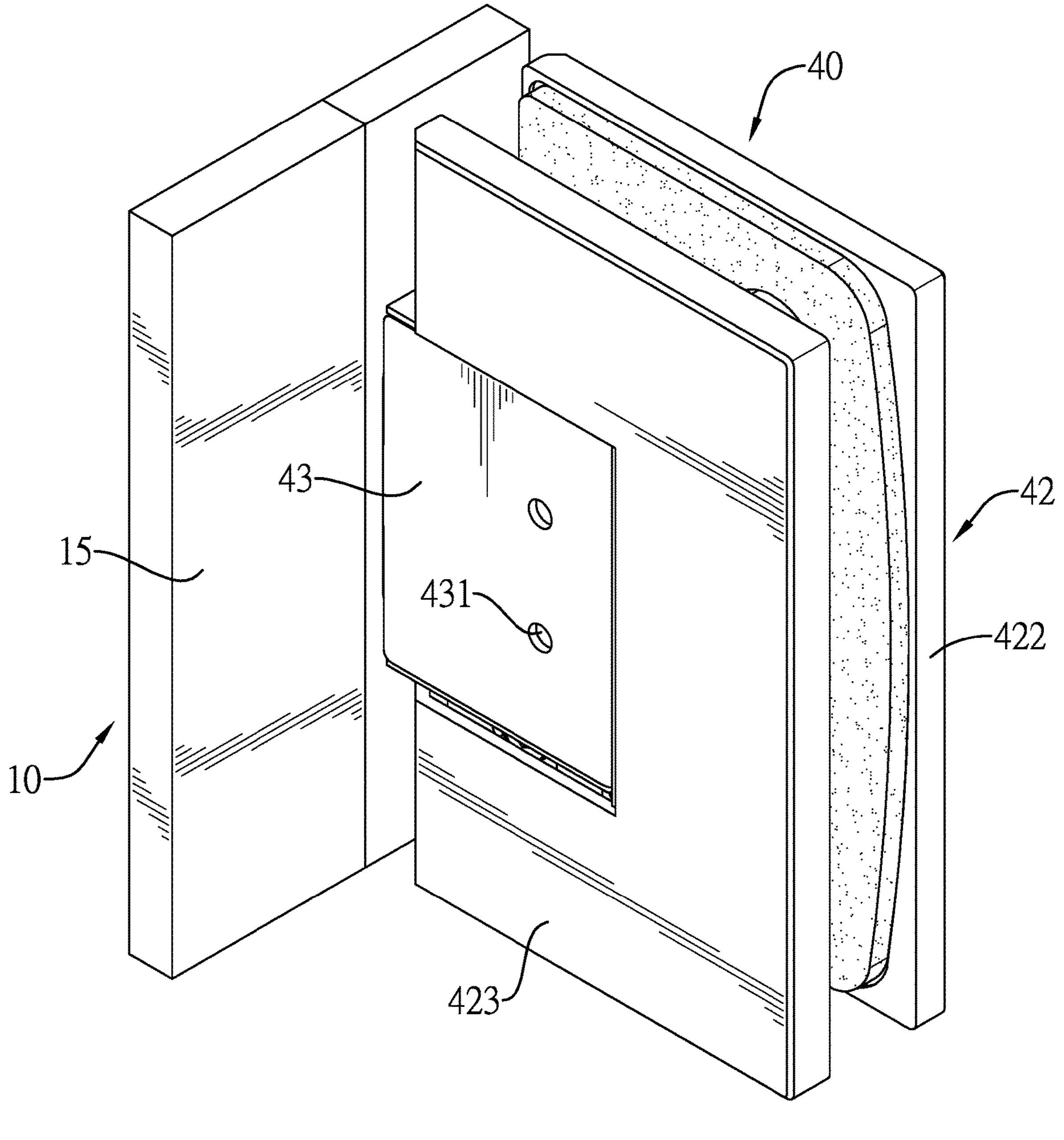
FIG. 1 is a perspective view of an embodiment of a hinge mechanism in accordance with the present invention.
Figure 2:
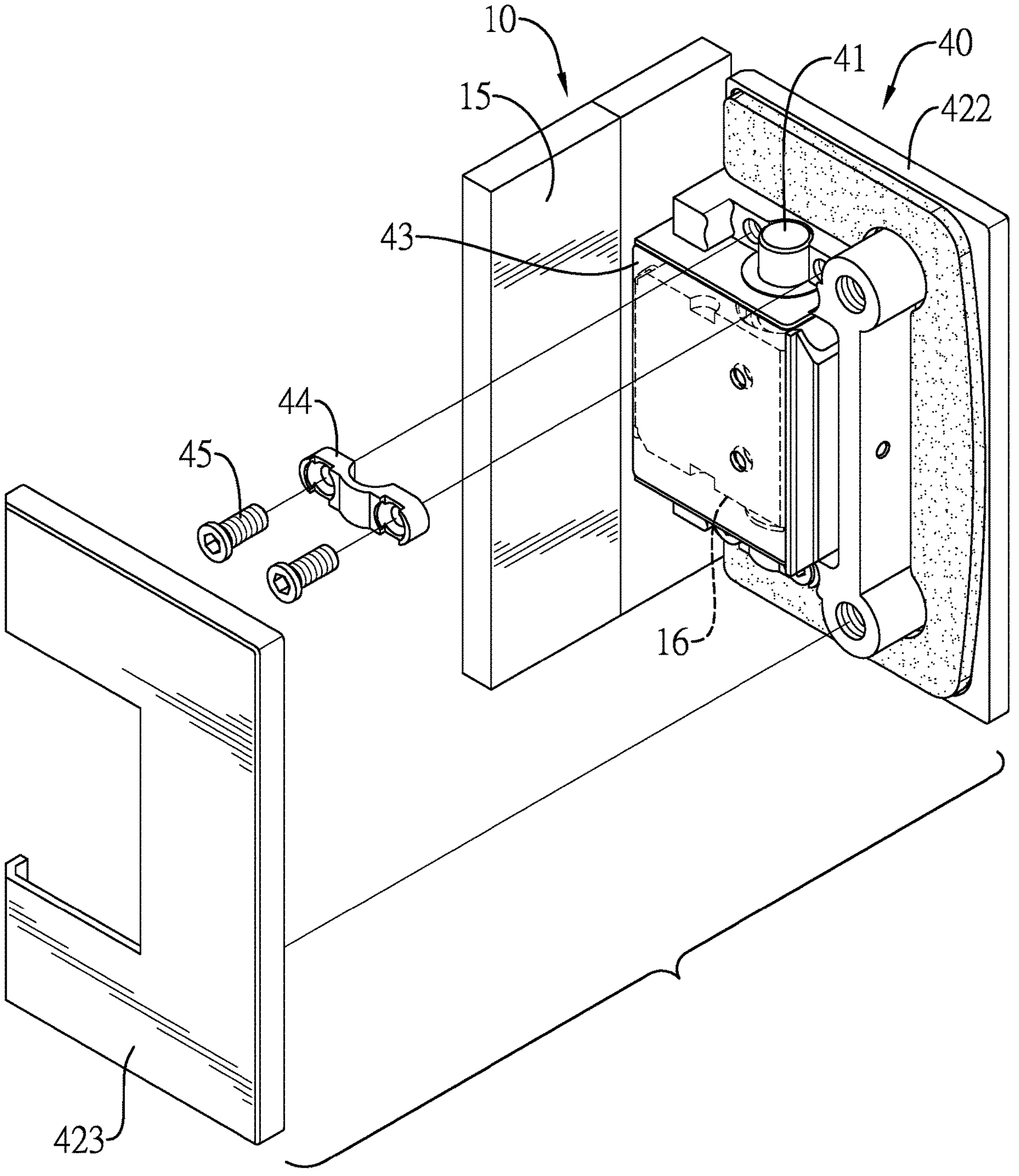
FIG. 2 is a partially-exploded perspective view of the hinge mechanism in accordance with the present invention.

Furthermore, as shown in FIG. 2, the door-fixing component 42 comprises a foundation plate 422 and a clamping plate 423 mounted at the foundation plate 422. The movable assembly 40 comprises two pressing elements 44 and multiple pressing screws 45. The two pressing elements 44 are fixed at the foundation plate 422 with the multiple pressing screws 45. The two pressing elements 44 and the foundation plate 422 together clamp two ends of the shaft 41 to connect the shaft 41 and the door-fixing component 42. The foundation plate 422 and the clamping plate 423 together clamp the door plate 50 to install it on the door-fixing component 42.

To sum up, the first guided assembly 20 and the second guided assembly 30 are respectively guided by the first guiding element 13 and the second guiding element 14 to move away from each other or move back. Therefore, by connecting the shaft 41 with the first guided assembly 20 or the second guided assembly 30, the movable assembly 40 drives the door plate 50 up and down normally regardless that the fixation seat 10 is mounted at the left-side or right-side installing surface 60. So, the hinge mechanism can be used to install the door plate 50 to both the left-side and right-side installing surfaces 60, and therefore is convenient in installation, usage and manufacture.

Even though numerous characteristics and advantages of the present invention have been set forth in the foregoing description, together with details of the structure and features of the invention, the disclosure is illustrative only. Changes may be made in the details, especially in matters of shape, size, and arrangement of parts within the principles of the invention to the full extent indicated by the broad general meaning of the terms in which the appended claims are expressed.

What is claimed is:

1. A hinge mechanism comprising:

a fixation seat having
- a first containing indentation;
- a second containing indentation; the first containing indentation and the second containing indentation arranged axially up and down and opposite to each other, and in spatial communication with each other;
- a first guiding element mounted in the first containing indentation;
- a second guiding element mounted in the second containing indentation; the fixation seat comprising:
- an assembling plate; and
- a fixation component mounted at the assembling plate; the first containing indentation and the second containing indentation of the fixation seat formed in the fixation component;

a first guided assembly, which is mounted at the first containing indentation of the fixation seat, corresponds to and abuts the first guiding element;

a second guided assembly, which is mounted at the second containing indentation of the fixation seat, corresponds to and abuts the second guiding element; wherein the first guided assembly is guided by the first guiding element to move away from the second guided assembly or move back, and the second guided assembly is guided by the second guiding element to move away from the first guided assembly or move back; and a movable assembly comprising:
- a shaft axially movable and pivotable, mounted through the fixation seat, the first containing indentation, and the second containing indentation, the shaft optionally connected to one of the first guided assembly and the second guided assembly; and
- a door-fixing component mounted at the shaft, such that the door-fixing component is pivotable relative to the fixation seat via the shaft;

wherein when the shaft is connected to the first guided assembly, the pivoting door-fixing component is moved up and down via the first guided assembly guided by the first guiding element;

wherein when the shaft is connected to the second guided assembly, the pivoting door-fixing component is moved up and down via the second guided assembly guided by the second guiding element;

the movable assembly comprising:
- a cover disposed in the door-fixing component and covering the fixation component of the fixation seat, the first guided assembly and the second guided assembly; the shaft mounted through the cover; the cover having
- two through holes respectively corresponding to the first guided assembly and the second guided assembly in position.

2. The hinge mechanism as claimed in claim 1, wherein the first guided assembly comprises
- a first moved element configured to be moving up and down, pivotable, mounted in the first containing indentation, and abutting the first guiding element;

a first elastic element abutting the first moved element and the door-fixing component;

a first connecting element configured to connect the first moved element and the shaft;

the second guided assembly comprises a second moved element configured to be moving up and down, pivotable, mounted in the second containing indentation, and abutting the second guiding element;

a second elastic element abutting the second moved element and the door-fixing component; and a second connecting element configured to connect the second moved element and the shaft;

one of the first connecting element and the second connecting element is selectively operated; when the first connecting element connects the first moved element and the shaft, the first moved element and the shaft are configured to be moved together; when the second connecting element connects the second moved element and the shaft, the second moved element and the shaft are configured to be moved together.

3. The hinge mechanism as claimed in claim 2, wherein the shaft has a first screw hole;

a second screw hole, the first screw hole and the second screw hole arranged up and down and spaced apart from each other;

the first connecting element is threaded and is fastened in the first screw hole of the shaft;

the second connecting element is threaded and is fastened in the second screw hole of the shaft;

the first moved element has a first cooperating hole corresponding to the first screw hole;

the second moved element has a second cooperating hole corresponding to the second screw hole;

the shaft is mounted through the first moved element and the second moved element;

by operating the first connecting element to reach into the first cooperating hole of the first moved element to connect the first moved element and the shaft, the first moved element is connected to and driven with the shaft; and by operating the second connecting element to reach into the second cooperating hole of the second moved element to connect the second moved element and the shaft, the second moved element is connected to and driven with the shaft.

4. The hinge mechanism as claimed in claim 2, wherein the first guiding element has one or two first slopes; two ends of the one or two first slopes being away from the second guiding element relative to a middle point of the one or two first slopes; the first moved element abutting the one or two first slopes of the first guiding element and guided by the one or two first slopes to be moved up and down and pivoted; and the second guiding element has one or two second slopes; two ends of the one or two second slopes being away from the first guiding element relative to a middle point of the one or two second slopes; the second moved element abutting the one or two second slopes of the second guiding element and guided by the one or two second slopes to be moved up and down and pivoted.

5. The hinge mechanism as claimed in claim 4, wherein the one or two first slopes of the first guiding element comprise two first inclined segments opposite to each other;

a first level segment disposed between the two first inclined segments;

the first moved element has one or two first cooperating portions abutting the one or two first slopes; a contour of the one or two first cooperating portions corresponding to a contour of the one or two first slopes;

the one or two second slopes of the second guiding element comprise two second inclined segments opposite to each other;

a second level segment disposed between the two second inclined segments; and the second moved element has one or two second cooperating portions abutting the one or two second slopes; a contour of the one or two second cooperating portions corresponding to a contour of the one or two second slopes.

6. The hinge mechanism as claimed in claim 1, wherein the first containing indentation has at least one first position-limiting groove;

the first guiding element has at least one first position-limiting protrusion reaching into the at least one first position-limiting groove to limit the first guiding element in position;

the second containing indentation has at least one second position-limiting groove; and the second guiding element has at least one second position-limiting protrusion reaching into the at least one second position-limiting groove to limit the second guiding element in position.

7. The hinge mechanism as claimed in claim 2, wherein the first containing indentation has at least one first position-limiting groove;

the first guiding element has at least one first position-limiting protrusion reaching into the at least one first position-limiting groove to limit the first guiding element in position;

the second containing indentation has at least one second position-limiting groove; and the second guiding element has at least one second position-limiting protrusion reaching into the at least one second position-limiting groove to limit the second guiding element in position.

8. The hinge mechanism as claimed in claim 3, wherein the first containing indentation has at least one first position-limiting groove; and the first guiding element has at least one first position-limiting protrusion reaching into the at least one first position-limiting groove to limit the first guiding element in position;

the second containing indentation has at least one second position-limiting groove; and the second guiding element has at least one second position-limiting protrusion reaching into the at least one second position-limiting groove to limit the second guiding element in position.

9. The hinge mechanism as claimed in claim 4, wherein the first containing indentation has at least one first position-limiting groove;

the first guiding element has at least one first position-limiting protrusion reaching into the at least one first position-limiting groove to limit the first guiding element in position;

the second containing indentation has at least one second position-limiting groove; and the second guiding element has at least one second position-limiting protrusion reaching into the at least one second position-limiting groove to limit the second guiding element in position.

10. The hinge mechanism as claimed in claim 5, wherein the first containing indentation has at least one first position-limiting groove;

the first guiding element has at least one first position-limiting protrusion reaching into the at least one first position-limiting groove to limit the first guiding element in position;

the second containing indentation has at least one second position-limiting groove; and the second guiding element has at least one second position-limiting protrusion reaching into the at least one second position-limiting groove to limit the second guiding element in position.

11. The hinge mechanism as claimed in claim 1, wherein the door-fixing component comprises a foundation plate;

a clamping plate mounted at the foundation plate;

the movable assembly comprises multiple pressing screws; and two pressing elements fixed at the foundation plate with the multiple pressing screws, the two pressing elements and the foundation plate together clamping two ends of the shaft to connect the shaft and the door-fixing component.

12. The hinge mechanism as claimed in claim 5, wherein the door-fixing component comprises a foundation plate;

a clamping plate mounted at the foundation plate;

the movable assembly comprises multiple pressing screws; and two pressing elements fixed at the foundation plate with the multiple pressing screws, the two pressing elements and the foundation plate together clamping two ends of the shaft to connect the shaft and the door-fixing component.

13. The hinge mechanism as claimed in claim 6, wherein the door-fixing component comprises a foundation plate;

a clamping plate mounted at the foundation plate;

the movable assembly comprises multiple pressing screws; and two pressing elements fixed at the foundation plate with the multiple pressing screws, the two pressing elements and the foundation plate together clamping two ends of the shaft to connect the shaft and the door-fixing component.

14. The hinge mechanism as claimed in claim 10, wherein the door-fixing component comprises a foundation plate;

a clamping plate mounted at the foundation plate;

the movable assembly comprises multiple pressing screws; and two pressing elements fixed at the foundation plate with the multiple pressing screws, the two pressing elements and the foundation plate together clamping two ends of the shaft to connect the shaft and the door-fixing component.

* * * * *